United States Patent
Heinrichs-Bartscher

(10) Patent No.: US 9,776,629 B2
(45) Date of Patent: Oct. 3, 2017

(54) METHOD FOR OPERATING AN ENVIRONMENT MONITORING SYSTEM FOR A MOTOR VEHICLE

(71) Applicant: Lucas Automotive GmbH, Koblenz (DE)

(72) Inventor: Sascha Heinrichs-Bartscher, Neuwied (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/427,845

(22) PCT Filed: Sep. 12, 2013

(86) PCT No.: PCT/EP2013/068892
§ 371 (c)(1),
(2) Date: Mar. 12, 2015

(87) PCT Pub. No.: WO2014/041062
PCT Pub. Date: Mar. 20, 2014

(65) Prior Publication Data
US 2015/0224986 A1  Aug. 13, 2015

(30) Foreign Application Priority Data
Sep. 12, 2012 (DE) .................. 10 2012 018 012

(51) Int. Cl.
*B60W 30/08* (2012.01)
*B60W 40/107* (2012.01)
(Continued)

(52) U.S. Cl.
CPC .............. *B60W 30/08* (2013.01); *B60T 7/22* (2013.01); *B60W 40/107* (2013.01);
(Continued)

(58) Field of Classification Search
CPC ......... B60R 11/04; B60T 8/1755; B60T 8/172
See application file for complete search history.

(56) References Cited

U.S. PATENT DOCUMENTS 5,495,254 A    2/1996  Uemura et al.
5,986,601 A *  11/1999  Sugimoto ............... G01S 7/415
                                                         342/109
(Continued)

FOREIGN PATENT DOCUMENTS

DE       4339371 A1    5/1994
DE       19964020 A1   7/2001
(Continued)

*Primary Examiner* — Michael D Lang
(74) *Attorney, Agent, or Firm* — MacMillan, Sobanski & Todd, LLC

(57) ABSTRACT

The invention relates to a method for operating an environment-monitoring system for a motor vehicle, by means of which the positions of objects in the environment laterally adjacent to, in front of, and behind the vehicle are determined. According to the invention, in order to improve the accuracy of the environment-monitoring system, the motion path is determined for a stationary object which the vehicle passes, and said motion path is used to determine the angular deviation with which the motion path determined for the stationary object deviates from the motion path of the vehicle.

8 Claims, 3 Drawing Sheets

(51) Int. Cl.
  *B60W 40/12*   (2012.01)
  *G01S 17/42*   (2006.01)
  *G01S 17/58*   (2006.01)
  *G01S 17/93*   (2006.01)
  *G01S 7/40*    (2006.01)
  *G01S 7/497*   (2006.01)
  *G01S 13/42*   (2006.01)
  *G01S 13/58*   (2006.01)
  *B60T 7/22*    (2006.01)
  *B60W 50/00*   (2006.01)
  *B60W 50/14*   (2012.01)
  *G01S 13/93*   (2006.01)

(52) U.S. Cl.
  CPC ........... B60W 40/12 (2013.01); G01S 7/4026 (2013.01); G01S 7/4972 (2013.01); G01S 13/42 (2013.01); G01S 13/58 (2013.01); G01S 13/931 (2013.01); G01S 17/42 (2013.01); G01S 17/58 (2013.01); G01S 17/936 (2013.01); *B60W 2050/0088* (2013.01); *B60W 2050/143* (2013.01); *B60W 2420/52* (2013.01); *B60W 2520/10* (2013.01); *B60W 2530/18* (2013.01); *B60W 2550/10* (2013.01); *B60W 2550/143* (2013.01); *B60W 2720/10* (2013.01); *G01S 2013/9321* (2013.01); *G01S 2013/9346* (2013.01); *G01S 2013/9353* (2013.01); *G01S 2013/9385* (2013.01)

(56) References Cited

U.S. PATENT DOCUMENTS

| | | |
|---|---|---|
| 6,300,896 B1 | 10/2001 | Kull et al. |
| 6,611,741 B2 | 8/2003 | Michi et al. |
| 7,571,066 B2 | 8/2009 | Höver et al. |
| 8,326,480 B2 | 12/2012 | Köbe et al. |
| 8,868,326 B2 | 10/2014 | Heinrichs-Bartscher et al. |
| 8,868,327 B2 | 10/2014 | Heinrichs-Bartscher et al. |
| 2004/0027272 A1 | 2/2004 | Richardson et al. |

FOREIGN PATENT DOCUMENTS

| | | |
|---|---|---|
| DE | 10107219 A1 | 8/2002 |
| DE | 102004033212 A1 | 2/2006 |
| DE | 102006045165 A1 | 4/2008 |
| DE | 102007029870 A1 | 1/2009 |
| DE | 102010054221 A1 | 8/2011 |
| EP | 1014108 A1 | 6/2000 |
| EP | 1286177 A1 | 2/2003 |
| GB | 2387670 A | 10/2003 |
| WO | 2004045888 A1 | 6/2004 |
| WO | 2012062451 A1 | 5/2012 |

\* cited by examiner

METHOD FOR OPERATING AN ENVIRONMENT MONITORING SYSTEM FOR A MOTOR VEHICLE

CROSS-REFERENCE TO RELATED APPLICATIONS

This application is a national stage of International Application No. PCT/EP2013/068891 filed Sep. 12, 2013, and which claims priority to German Patent Application No. 10 2012 018 012.8 filed Sep. 12, 2012, the disclosures of which are incorporated herein by reference in their entirety.

BACKGROUND OF THE INVENTION

The invention relates to a method for operating an environment-monitoring system for a motor vehicle, by means of which the positions of objects in the environment laterally adjacent to and also in front of and behind the vehicle are determined.

Document DE 101 07 219 A1 relates to a method for operating an adaptive driving-speed control system for a motor vehicle. The adaptive driving-speed control system includes a central control unit to which speed data and spacing data are communicated from a radar sensor. The document makes reference to a method and an apparatus for recognition of maladjustment in a motor vehicle. In this case electromagnetic waves are emitted, and the electromagnetic waves reflected from a stationary object are received and evaluated; the signals that are capable of being evaluated are the relative angle and a relative spacing between the detected stationary object and a reference axis of the motor vehicle, as well as a relative velocity between the detected stationary object and the motor vehicle; subsequently, on the basis of the relative angle and the relative spacing between the motor vehicle and the detected stationary object, and also on the basis of a vehicle-specific velocity, a correction value for the relative angle is determined.

Document DE 43 39 371 A1 relates to a detection method for registering a horizontal error between a scan centre line and the travel-direction line of a vehicle during straight-ahead driving. With this method, a computer registers a change of position of a reflector that has been provided at the left edge of a road. A further computer derives a location of the reflector, which represents a spacing between the reflector and the vehicle and a direction of the vehicle from the reflector.

Document DE 10 2006 045 165 A1 relates to a driving-assistance system for motor vehicles, with an angle-resolving position-finding sensor and with a locking and unlocking device for disabling and enabling an assistance function. The driving-assistance system includes an angle-resolving position-finding sensor and an electronic data-processing system which evaluates the data supplied by the position-finding sensor, and on this basis performs one or more assistance functions. In the data-processing system a correction module has, in addition, been implemented, with which any faulty adjustment, i.e. a maladjustment angle, of the position-finding sensor can be established during operation of the driving-assistance system. An independent algorithm for determining the maladjustment angle is based on the evaluation of apparent transverse motions of stationary objects at the edge of the roadway, which are simulated by the maladjustment of the sensor.

Document EP 1 286 177 A1 relates to the registering of an occurrence of an axial displacement in a horizontal direction in the case of a radar mounted on a vehicle, the determining of the degree of axial displacement in the horizontal direction, and the correction of the axial displacement in the horizontal direction. In this connection an FM-CW radar radiates a radio wave in the forward direction of the vehicle and calculates the spacing from a target located in front of said vehicle, and the relative velocity thereof.

It is already known to employ environment-monitoring systems in modern motor vehicles. The most important components of an environment-monitoring system are sensors that register the range, the angular position and the relative velocity of objects in the environment laterally adjacent to and also in front of and behind the vehicle in question. Since the greatest efficiency when determining the position of objects above all, in bad weather is obtained by means of radar sensors, here the designation 'environment-monitoring system' is to be regarded as synonymous with the designation 'radar system'.

By means of environment-monitoring systems, inter alia the following functions are realised with a view to enhancing the driving safety.

In the case of adaptive speed control (ACC, adaptive cruise control), the positions of vehicles travelling ahead of the vehicle in question are registered, in order to adapt the speed of the vehicle in question to changing traffic conditions automatically by self-acting accelerating, easing off the throttle, or braking. Hence an ACC system permits the maintenance of a spacing, depending on speed, of the vehicle in question from a vehicle in front. An ACC system has been described in WO 2004/045888 A1.

In the case of a collision warning system (FCW, forward collision warning), in addition to an ACC system the driver is warned of critical spacing situations and, by automatic partial braking, is assisted in shortening the stopping-distance. In the case of an automatic emergency braking system (AEB, automatic emergency braking), furthermore collisions can even be avoided entirely in the ideal case. An FCW or AEB system has been described in WO 2012/062451 A1.

In the case of a lane-change assistance system (LCA, lane change assistant), the positions of vehicles travelling behind and laterally adjacent to the vehicle in question are registered, in order to warn the driver about vehicles in the blind spot adjacent to his/her own vehicle, and about vehicles that are located in a region adjacent to or behind his/her own vehicle that is critical for a change of lane. An LCA system has been described in DE 10 2010 054 221 A1.

BRIEF SUMMARY OF THE INVENTION

Since for the purpose of determining the position of features the polar coordinates thereof, namely the range thereof and the angular position thereof with respect to the actual sensor(s), are registered, it is necessary to adjust the sensor(s) very precisely in the course of mounting on the vehicle, specifically in such a way that the mounting position(s) of the sensor(s) for monitoring the environment in front of and behind the vehicle has/have been oriented parallel to the longitudinal axis of the vehicle and the mounting position(s) of the sensor(s) for monitoring the environment laterally adjacent to the vehicle has/have been oriented perpendicular to the longitudinal axis of the vehicle. If this has not been ensured, above all the acquisition of the angular position of objects becomes faulty, so that the accuracy of the environment-monitoring system is impaired in disadvantageous manner. On the other hand, however, it is necessary to permit a specified mounting tolerance, in order to keep down the costs and the effort in connection with the mounting of the sensor(s).

In order to satisfy these requirements, with a view to operating an aforementioned environment-monitoring system the invention proposes that the motion path for a stationary object that the vehicle is moving past is ascertained, and from this the angular deviation is determined by which the motion path ascertained for the stationary object deviates from the motion path of the vehicle. In this connection, by 'environment-monitoring system' in the following a non-tactile environment-monitoring system is understood, which may have been configured as a radar, lidar, video or other acquisition system. In this connection, sensors registering the environment two-dimensionally or three-dimensionally may be employed, which register objects in contactless manner. The sensors of the environment-monitoring system may be radar antennas, cameras for the visible region of light, for the IR region and/or the UV region, laser scanners or such like.

In principle, the motion path of the vehicle may exhibit any arbitrary shape, in particular a winding shape, since modern motor vehicles have been equipped anyway with an electronic stability program (ESP) which makes available the data needed for determining the motion path of the vehicle, for example the steering angle, the yaw rate, the longitudinal/transverse acceleration and also the velocity of the vehicle. However, in order to optimise the effort and accuracy for determining the angular deviation, in preferred manner the invention provides that when the vehicle is moving along a rectilinear motion path the motion path for a stationary object that the vehicle is moving past is ascertained, and from this the angular deviation is determined by which the motion path ascertained for the stationary object deviates from the rectilinear motion path of the vehicle. For if the vehicle is moving along a (substantially) linear motion path, a (substantially) rectilinear motion path also arises for the stationary object.

Since the angular deviation determined in accordance with the invention corresponds to the fault angle that occurs when registering the angular position of objects if the mounting position of the actual sensor(s) has been oriented not perpendicular or not parallel to the longitudinal axis of the vehicle, the following advantages arise.

In advantageous manner, when the angular deviation is greater than or equal to a first predetermined limiting value an error message and/or a warning can be output, whereby a corresponding error code can be saved in a fault memory for diagnostic purposes. In the course of a visit to a workshop a mechanical realignment or readjustment of the affected sensor(s) can then be undertaken. For already in the event of slight rear-end collisions a mechanical misalignment of the sensor(s) may occur, above all when it/they has/have been mounted in the region of the bumpers of the vehicle.

In particularly preferred manner the invention provides that the angular deviation is drawn upon by way of correction value when determining the position of objects by means of the environment-monitoring system, so that during operation of the vehicle an electronic self-calibration of the sensor(s) is effected. Such a self-calibration can be carried out not only, for example, in the course of the 'end-of-line' test when commissioning the new vehicle and/or in the diagnostic mode during visits to a workshop, but also, for example, at periodic intervals as a function of a predetermined operating life and/or predetermined performance of the vehicle.

In accordance with the invention the angular deviation is determined with respect to stationary objects, that is to say, those whose relative-velocity component—viewed in the direction of motion of the vehicle in question—is equal to the velocity of the vehicle in question with sign reversed, and is drawn upon by way of correction value within the scope of the monitoring of the environment when determining the position of objects, above all moving objects—that is to say, vehicles that are moving relatively with respect to the vehicle in question.

In order to carry out the electronic self-calibration of the sensor(s) only when the mechanical adjustment of the sensor(s) lies within a specified mounting tolerance, the invention may provide that when the angular deviation is less than or equal to a second predetermined limiting value the angular deviation is drawn upon by way of correction value when determining the position of objects by means of the environment-monitoring system. In this connection, the second predetermined limiting value may correspond to the specified mounting tolerance, the order of magnitude of which may amount to ±3 degrees. The second predetermined limiting value may also correspond to the first predetermined limiting value which is decisive for a mechanical realignment or readjustment of the sensor(s).

Since, due to the electronic self-calibration, the determination of the position of objects is effected with very high accuracy, in advantageous manner the invention may further provide that the distance travelled by the vehicle between two successive determinations of position is ascertained, and from this the ground velocity of the vehicle is determined. The ground velocity of the vehicle, determined in this way, can be made available to other electronic vehicle systems for plausibility checks.

In this context an electronically controlled braking system that includes an electronic stability program (ESP) is particularly relevant, since the ground velocity of the vehicle can be drawn upon for determining the rolling circumference of the wheels of the vehicle. For in the case of ESP the rolling circumference of the wheels enters into the calculation of the wheel speeds as a parameter, so that through the knowledge of the rolling circumference the accuracy of the calculation of the wheel speeds, and consequently the control quality of the ESP, can be improved.

Since the electronic vehicle systems in modern motor vehicles each include electronic control units (ECU) that exchange data with one another via bus systems—for example via a controller area network (CAN)—the invention also relates to an ECU for a motor vehicle with at least one microcomputer, whereby the method according to the invention has been stored at least partly on the at least one microcomputer as a computer program and runs at least partly on the at least one microcomputer. For it is a great advantage of the method according to the invention that it can be implemented in software-engineering terms on the at least one microcomputer, so that no cost-intensive and elaborate changes to the system hardware are necessary.

It is quite essential that the method according to the invention can be distributed in software-engineering form to one or more ECUs in a motor vehicle.

Therefore the invention also relates to an environment-monitoring system for a motor vehicle, by means of which the positions of objects in the environment laterally adjacent to and also in front of and behind the vehicle are determined, whereby the ECU, on the at least one microcomputer of which the method according to the invention has been stored at least partly and runs at least partly, is a constituent of the environment-monitoring system.

Since the environment-monitoring system interacts with the braking system, for example in order to slow down the motor vehicle automatically, the invention also relates to an electronically controlled braking system for a motor vehicle that includes, inter alia, an electronic stability program (ESP), whereby the ECU, on the at least one microcomputer of which the method according to the invention has been stored at least partly and runs at least partly, is a constituent of the braking system.

Since the environment-monitoring system interacts with the driveline (drive motor-transmission-differential), for example in order to accelerate the motor vehicle automatically, and the braking system interacts with the driveline, for example in order to adapt the power of the drive motor of the motor vehicle, the invention also relates to an electronically controlled driveline for a motor vehicle, which includes, inter alia, an electronic engine management system (EMS), whereby the ECU, on the at least one microcomputer of which the method according to the invention has been stored at least partly and runs at least partly, is a constituent of the driveline.

Other advantages of this invention will become apparent to those skilled in the art from the following detailed description of the preferred embodiments, when read in light of the accompanying drawings.

DETAILED DESCRIPTION OF THE INVENTION

Figure 1:
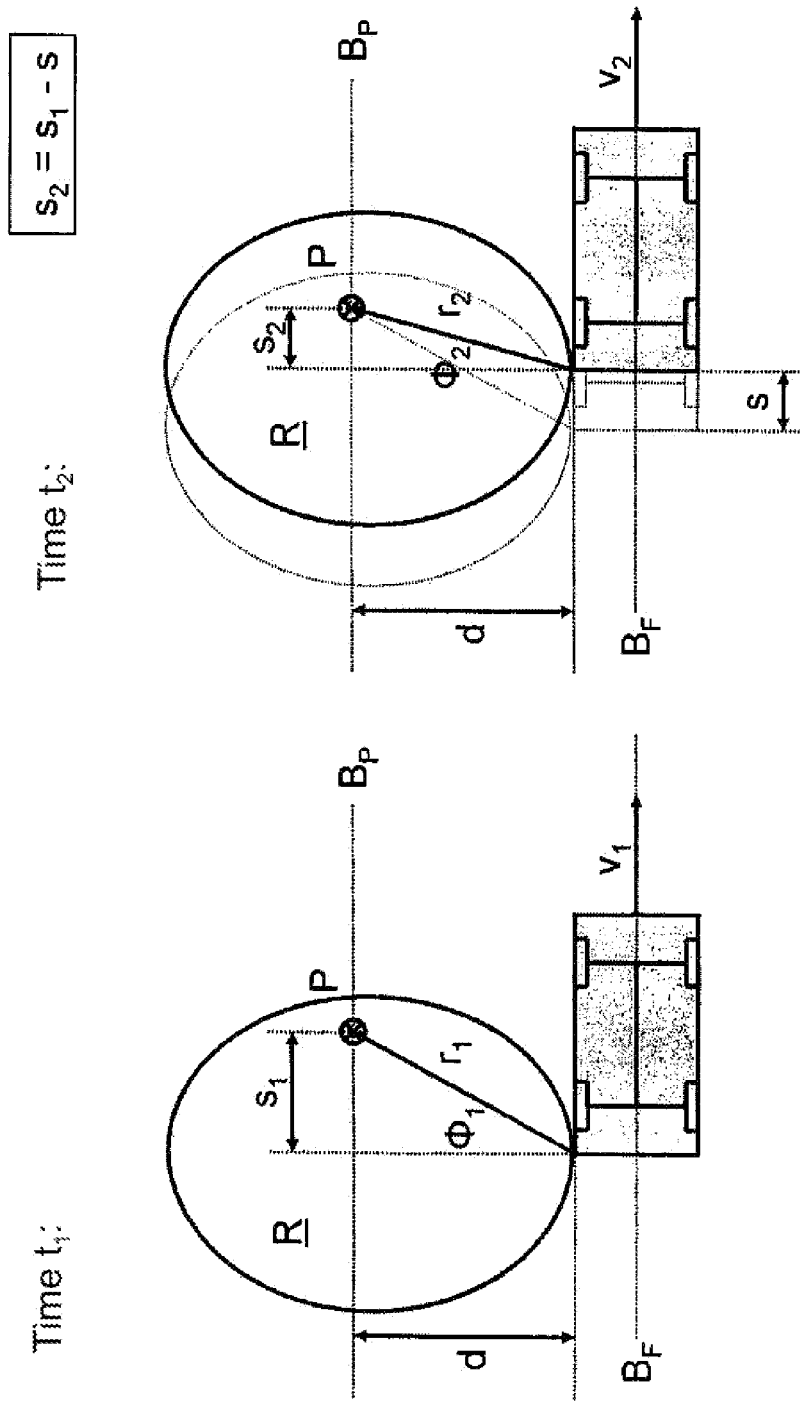
FIG. 1 shows, at two successive times, a vehicle with a correctly calibrated radar system, which is moving past a stationary object.

In FIG. 1, at two successive times $t_1$ and $t_2$ a vehicle is observed which is moving along a rectilinear motion path $B_F$—that is to say, on a motion path $B_F$ without change of direction. The rectilinear motion path $B_F$ of the vehicle leads past a stationary or standing object P at a parallel spacing d. The vehicle is equipped with a non-tactile environment-monitoring system—that is to say, for example, a radar, lidar, or video acquisition system—the receiving sensor of which, for example of a radar system, has been set up to register the environment to the left adjacent to the vehicle and to the left behind the vehicle viewed in the direction of motion of the vehicle. In FIG. 1 a correctly calibrated or adjusted radar system is assumed, in which the predetermined mounting position of the radar sensor at the left rear corner of the vehicle has been determined in such a way that the acquisition region R of the radar system has been oriented precisely perpendicular to the longitudinal axis of the vehicle.

At time $t_1$ the stationary object P has come within the acquisition region R of the radar system, and for the purpose of determining the position of the stationary object the polar coordinates thereof, namely the range $r_1$ and the angle $\Phi_1$, are registered with respect to the left rear corner of the vehicle viewed in the direction of motion of the vehicle. From the range $r_1$ and the angle $\Phi_1$ both the parallel spacing d from the stationary object P $$d=r_1 \cos(\Phi_1)$$

and the distance $s_1$ that the left rear corner of the vehicle, starting from time $t_1$, (still) has to travel until said corner is located (precisely) at the parallel spacing d from the stationary object P can be determined:

$$s_1=r_1 \sin(\Phi_1)$$

At time $t_2$ the vehicle, starting from time $t_1$, has travelled the distance s, and the stationary object P is still located in the acquisition region R of the radar system, so the range $r_2$ and the angle $\Phi_2$ with respect to the left rear corner of the vehicle can be registered, and likewise both the parallel spacing d from the stationary object P $$d=r_2 \cos(\Phi_2)$$

and the distance $s_2$, which the left rear corner of the vehicle, starting from time $t_2$, (still) has to travel until said corner is located (precisely) at the parallel spacing d from the stationary object P, can be determined.

$$s_2=r_2 \sin(\Phi_2)$$

If the radar system has been correctly calibrated or adjusted, as a first condition B1

$$r_1 \cos(\Phi_1)=r_2 \cos(\Phi_2) \quad \quad (B1)$$

holds, because the parallel spacing d remains constant at times $t_1$ and $t_2$. Therefore the motion path $B_P$ ascertained for the stationary object P also runs parallel to the rectilinear motion path $B_F$ of the vehicle.

Between times $t_1$ and $t_2$ the vehicle has travelled the distance s. Therefore between distances $s_1$ and $s_2$ and distance s there exists the relationship $$s_2=s_1-s$$

and, as a second condition B2 for the radar system to have been correctly calibrated or adjusted, it holds that $$\cdot r_2 \sin(\Phi_2)=r_1 \sin(\Phi_1)-s \quad \quad (B2)$$

Since the velocities $v_1$ and $v_2$ of the vehicle at times $t_1$ and $t_2$ are each known—for example, on the basis of the wheel-speed calculation which is present anyway in the ESP—on the assumption of a uniformly accelerated motion between times $t_1$ and $t_2$ with the constant acceleration $$a=(v_2-v_1)/(t_2-t_1)$$

the distance s can be ascertained by twofold integration:

$$s=\tfrac{1}{2}(v_2-v_1)(t_2-t_1)+v_1(t_2-t_1)$$

Figure 2:
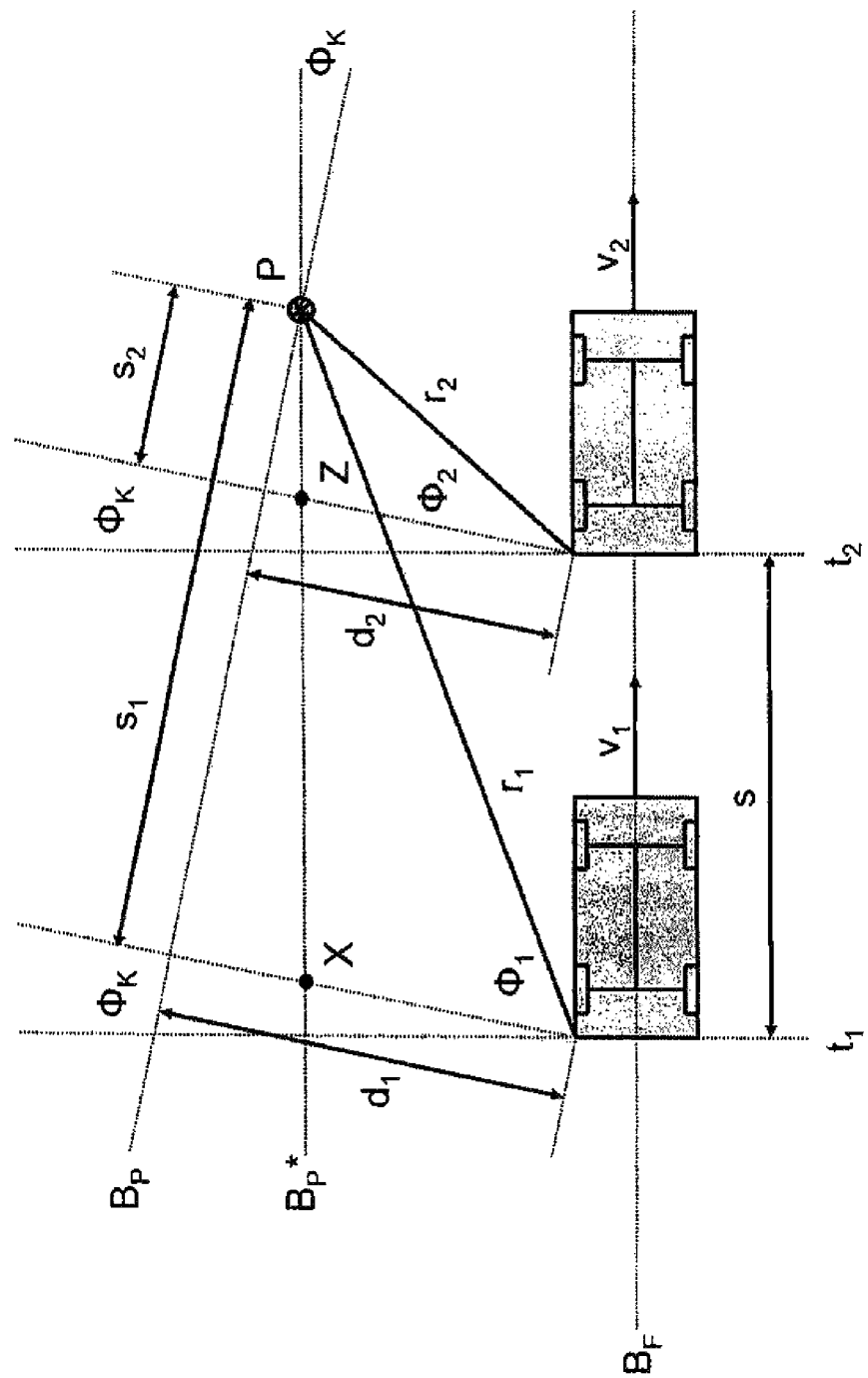
FIG. 2 shows, at two successive times, a vehicle with an incorrectly calibrated radar system, which is moving past a stationary object.

In FIG. 2 the vehicle that is being moved past the stationary object P has been represented at two successive times $t_1$ and $t_2$ in the case where the radar system has not been correctly calibrated or adjusted; that is to say, in contrast to FIG. 1, the predetermined mounting position of the radar sensor is not maintained, so the acquisition region R of the radar system has not been oriented perpendicular to the longitudinal axis of the vehicle. In this case an angular deviation $\Phi_K$ arises, by reason of which the motion path $B_P$ ascertained for the stationary object P does not run parallel to the rectilinear motion path $B_F$ of the vehicle. In the situation represented in FIG. 2 the spacing $d_1$ at time $t_1$ is greater than the spacing $d_2$ at time $t_2$ ($d_1>d_2$). The angle at which the motion path $B_P$ ascertained for the stationary object P and the rectilinear motion path $B_F$ of the vehicle run towards one another corresponds, by reason of the geometrical conditions, to the angular deviation $\Phi_K$.

By reason of the geometrical conditions the angular deviation $\Phi_K$ can be ascertained, by the motion path $B_P$ ascertained for the stationary object P being projected onto a virtual motion path $B_P^*$ for the stationary object P that runs parallel to the rectilinear motion path $B_F$ of the vehicle. For this purpose, distance $s_1$ ascertained at time $t_1$ and distance $s_2$ ascertained at time $t_2$ are projected onto line segments XP and ZP which are located on the virtual motion path $B_P^*$, and the lengths thereof are determined. In this way, for line segment XP it follows that $$XP = s_1/\cos(\Phi_K)$$

and for line segment ZP $$ZP = s_2/\cos(\Phi_K)$$

Since, by reason of the geometrical conditions, distance s travelled between times $t_1$ and $t_2$ corresponds to the difference of the line segments XP and ZP, it holds that $$s = (s_1 - s_2)/\cos(\Phi_K)$$

Therefore the angular deviation $\Phi_K$ has been determined by the equation $$\Phi_K = \arccos((s_1 - s_2)/s) \tag{G1}$$

The determination of the angular deviation $\Phi_K$ for checking whether the radar system has been correctly calibrated or adjusted is carried out in preferred manner only whenever the vehicle is actually moving along a (substantially) rectilinear motion path $B_F$. In order to establish this, information or data present anyway in the ESP can be accessed, such as, for example, the steering angle, the yaw rate, the longitudinal/transverse acceleration and also the velocity $v_{VEH}$ of the vehicle.

Furthermore, the determination of the angular deviation $\Phi_K$ may relate only to stationary objects P. Since the radar system, or, to be more exact, the radar sensor, registers, besides the polar coordinates, also the relative velocity $v_{REL}$ of objects with respect to the velocity $v_{VEH}$ of the vehicle in question, stationary objects P can be identified as such, the relative-velocity component of which—viewed in the direction of motion of the vehicle in question—$v_{REL,X}$ is equal to the velocity $v_{VEH}$ of the vehicle in question with sign reversed ($v_{REL,X} = -v_{VEH}$). In practice, for the identification of stationary objects P a deviation $\Delta_v$ is permitted, the order of magnitude of which amounts to ±3 km/h, so that the difference formed from the absolute value of the relative-velocity component—viewed in the direction of motion of the vehicle in question—$v_{REL,X}$ and the absolute value of the velocity $v_{VEH}$ of the vehicle must be less than or equal to this deviation $$||v_{REL,X}| - |v_{VEH}|| \leq |\Delta_v|$$

In order to ensure the accuracy and the quality of the angular deviation $\Phi_K$ determined in this way, in the practical application of the method according to the invention during operation of the radar system the determinations of the positions of stationary objects P are not undertaken only at two successive times $t_1$ and $t_2$—as in the (simplified) embodiment according to FIGS. 1 and 2 but rather, when carrying out the method according to the invention, predetermined criteria must have been satisfied in order that an angular deviation $\Phi_K$ currently being determined is verified and approved for further measures. The following criteria K1 to K4 may come into consideration, by themselves or in suitable combination with one another:

K1. The determination of the position of the stationary object P must have been effected by way of a predetermined minimum number $N_{TMIN}$ of successive times $t_1$ to $t_n$ ($n \geq N_{TMIN}$).

K2. The stationary object P must have been located in the acquisition region R of the radar system for a predetermined minimum period of time $T_{MIN}$ ($t_n - t_1 \geq T_{MIN}$), whereby the predetermined minimum period of time $T_{MIN}$ may have been chosen as a function of the velocity $v_{VEH}$ of the vehicle ($T_{MIN} = f(v_{VEH})$)

K3. During the period of the determination of the position of the stationary object P the velocity $v_{VEH}$ of the vehicle must be greater than or equal to a predetermined minimum velocity $v_{MIN}$ ($v_{VEH} \geq v_{MIN}$). The order of magnitude of the predetermined minimum velocity $v_{MIN}$ may amount to 15 km/h.

K4. A predetermined minimum number $N_{PMIN}$ of different stationary objects $P_n$ according to at least one of the criteria K1 to K3 must have been registered ($n \geq N_{PMIN}$).

Since, by reason of the cited criteria K1 to K4, firstly a plurality of angular deviations $\Phi_K$ must be registered, the actual determination or verification of a current angular deviation $\Phi_K$ approved for further measures can be undertaken by means of statistical methods—for example, by evaluation of the frequency distribution or probability distribution of the registered plurality of angular deviations $\Phi_K$.

With the angular deviation $\Phi_K$ last determined and verified, the following further measures M1 to M4 can be carried out, by themselves or in suitable combination with one another:

M1. If the absolute value of the angular deviation $\Phi_K$ last determined is greater than or equal to a first predetermined limiting value $\Phi_{MAX1}$ (($|\Phi_K| \geq |\Phi_{MAX1}|$)), an error message or warning can be output and an error code can be saved in the fault memory of the radar system for diagnostic purposes. In this connection the exceeding of the first predetermined limiting value $\Phi_{MAX1}$ may also be cause for an updating of the angular deviation $\Phi_K$ last determined. The order of magnitude of the first predetermined limiting value $\Phi_{MAX1}$ amounts to ±3 degrees.

M2. The angular deviation $\Phi_K$ last determined is drawn upon by way of correction value or calibration value, in order to compensate for errors when determining the position of objects by the radar system, so that the radar system calibrates or adjusts itself electronically by itself. This is applied, above all, in the case of moving objects, that is to say, those whose relative-velocity component—viewed in the direction of motion the vehicle in question—$v_{REL,X}$ is unequal to the velocity $v_{VEH}$ of the vehicle in question ($|v_{REL,X}| \neq |v_{VEH}|$).

For this purpose, for example the correction value $\Phi_K$ is either added to or subtracted from the angles $\Phi_{ACT}$ registered for the objects, depending on the current sign, and the angles resulting therefrom, or, to be more exact, the corrected angles $\Phi_{SET}$ ($\Phi_{SET} = \Phi_{ACT} \neq \Phi_K$) are adopted for the polar coordinates of the registered objects.

Drawing upon the angular deviation $\Phi_K$ by way of correction value during the operation of the vehicle presupposes in practice that the radar system is already mechanically adjusted so precisely when it is mounted on the vehicle that the angular deviation caused by the mounting tolerance is less than or equal to a second predetermined limiting value $\Phi_{MAX2}$, the order of magnitude of which amounts to ±3 degrees. Therefore drawing upon the angular deviation $\Phi_K$ by way of correction value during the operation of the vehicle only takes place when the absolute value of the angular deviation $\Phi_K$ last determined is less than the second predetermined limiting value ($\Phi_{MAX2}$ ($|\Phi_K| \leq |\Phi_{MAX2}|$))

M3. While the self-calibration of the radar system is being carried out in accordance with measure M2 or has been activated, a plausibility check can be effected, by a check being made as to whether conditions B1 and/or B2 elucidated in connection with FIG. 1 have been satisfied within predetermined deviations $\Delta_{B1}$ and $\Delta_{B2}$; that is to say, whether $$|r_1 \cos(\Phi_1) - r_2 \cos(\Phi_2)| \leq |\Delta_{B1}|$$

and/or $$|r_2 \cos(\Phi_1) - r_1 \cos(\Phi_2) + s| \leq |\Delta_{B2}|$$

If one or both of conditions B1 and B2 is/are not satisfied, this may be cause for an updating of the angular deviation $\Phi_K$ last determined and/or for the output of an error message or warning, as well as saving an error code for diagnostic purposes.

M4. If the plausibility check according to measure M3 is carried out only on the basis of the first condition B1, the second condition B2 can be drawn upon to determine distance s and the current ground velocity $v_{ACT}$ of the vehicle. For from the second condition it follows that $$s = r_1 \sin(\Phi_1) - r_2 \sin(\Phi_2)$$

Since the two successive times $t_1$ and $t_2$, between which the vehicle travels distance s are known, the current ground velocity $v_{ACT}$ of the vehicle results as $$v_{ACT} = (r_1 \sin(\Phi_1) - r_2 \sin(\Phi_2))/(t_2 - t_1)$$

In this way, the determination of the velocity $v_{ACT}$ of the vehicle is effected entirely independently of the wheel-speed calculation in the ESP, so said calculation can be subjected to a plausibility check.

In practice, for the calculation of the wheel speeds $v_{WHEEL}$ in the ESP it is customary to ascertain the rotational speeds $n_{WHEEL}$ of the wheels of the vehicle over time and to multiply these by the parameter constituted by the rolling circumference $U_{WHEEL}$ of the wheels $$v_{WHEEL} = n_{WHEEL} U_{WHEEL}$$

Since the parameter constituted by the rolling circumference $U_{WHEEL}$ of the wheels varies by reason of changing the tyre size and by reason of wear of the tyres over the operating life of the vehicle, results deviating from one another when calculating the wheel speeds $v_{WHEEL}$ are the consequence, which may have a negative effect on the control quality of the ESP. In order to counteract this, the invention may provide that the parameter constituted by the rolling circumference $U_{WHEEL}$ is adapted to the current state of the wheels on account of knowledge of the current ground velocity $v_{ACT}$ of the vehicle on the basis of the method according to the invention via the equation $$U_{WHEEL} \leq v_{ACT}/n_{WHEEL}$$

This adaptation is carried out only when the vehicle is moving uniformly and rectilinearly—that is to say, moving with constant velocity and without change of direction—because only then do the wheel speeds $v_{WHEEL}$ and the ground velocity $v_{ACT}$ of the vehicle physically coincide ($v_{WHEEL} = v_{ACT}$).

Figure 3:
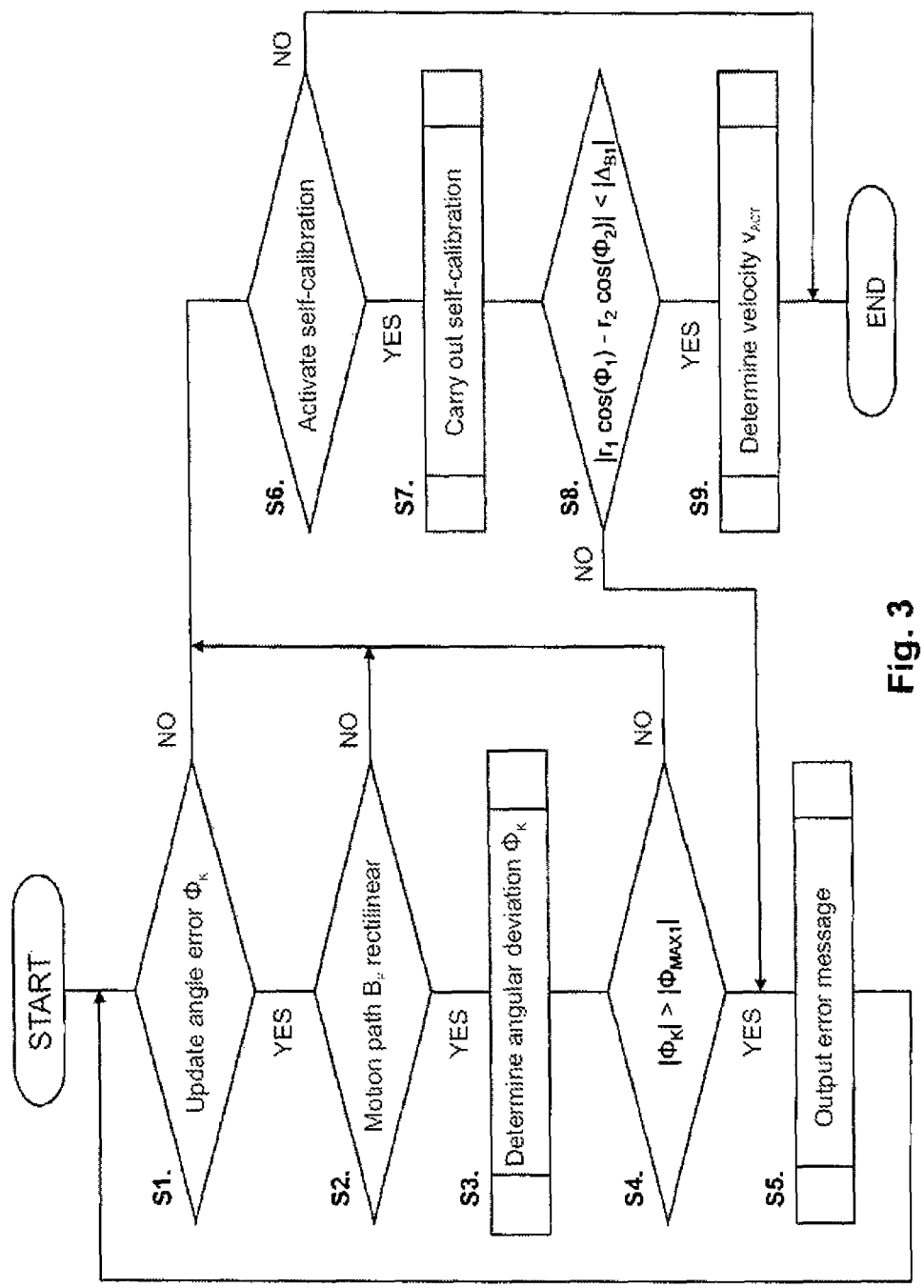
FIG. 3 shows a flow chart of a preferred embodiment of the method according to the invention.

In FIG. 3 a preferred embodiment of the method according to the invention has been represented as a flow chart, according to which steps S1 to S9 are executed as follows.

In step S1 it is queried whether the angular deviation $\Phi_K$ last determined is to be updated. If this is the case, in step S2 it is queried whether the motion path $B_F$, along which the vehicle is moving, is rectilinear. If this is the case, the procedure continues with step S3, in which a current angular deviation $\Phi_K$ is determined in accordance with equation G1 and verified on the basis of the aforementioned criteria K1 to K3.

Thereupon in step S4 the absolute value $\Phi_K$ is compared with the first predetermined limiting value $\Phi_{MAX1}$. If the absolute value of the angular deviation $\Phi_K$ last determined is greater than the limiting value $\Phi_{MAX1}$, the procedure continues with step S5, in which an error message or warning is output and an error code is saved for diagnostic purposes. Then step 1 is repeated.

If the query in step 1 shows that the angular deviation $\Phi_K$ last determined is not to be updated, or if the query in step 2 shows that the motion path $B_F$ is not rectilinear, the procedure continues with step S6.

The procedure also continues with step S6 if the comparison in step S4 shows that the absolute value of the angular deviation $\Phi_K$ last determined is not greater than the limiting value $\Phi_{MAX1}$.

In step S6 it is then queried whether the self-calibration of the radar system is to be activated. If this is not the case, the method according to the invention is concluded. Therefore the method according to the invention is always concluded when the angular deviation $\Phi_K$ last determined according to step S1 is not to be updated and if the self-calibration of the radar system according to step S6 is not to be activated.

If the query in step S6 shows that the self-calibration of the radar system is to be activated, the procedure continues with step S7, in which the actual self-calibration is carried out as previously described.

Meanwhile, in step S8 for the purpose of plausibility checking a comparison is made as to whether condition B1 has been satisfied within the predetermined deviation $\Delta_{B1}$. If this is the case, the procedure continues with step S9, in which the current ground velocity $v_{ACT}$ of the vehicle is ascertained.

If the comparison in step S8 shows that condition B1 has not been satisfied within the predetermined deviation $\Delta_{B1}$, the procedure continues with step S5.

In conclusion let it also be mentioned that a practical embodiment of the invention is elucidated in exemplary manner with reference to FIGS. 1 to 3, for which reason it lies within the discretion of a person skilled in the art to undertake modifications and combinations within the scope of the claims and the description. In this connection the embodiment has been described here for right-hand traffic, with an acquisition of the left side and the left rear of the vehicle. It will be understood that the invention, mirrored appropriately along the longitudinal axis of the vehicle, is also to be employed for vehicles in left-hand traffic.

In accordance with the provisions of other patent statutes, the principle and mode of operations of this invention have been explained and illustrated in its preferred embodiments. However, it must be understood that this invention may be practiced otherwise than as specifically explained and illustrated without departing from its spirit or scope.

The invention claimed is:

1. A method for operating an environment-monitoring system for a motor vehicle,
with the following steps:
making available an environment-monitoring system with at least one sensor for monitoring the environment in front of and behind the vehicle parallel to a longitudinal axis of the vehicle and with at least one sensor for monitoring the environment laterally adjacent to the vehicle perpendicular to the longitudinal axis of the vehicle,
determining positions of objects in the environment laterally adjacent to and also in front of and behind the vehicle by means of the environment-monitoring system, ascertaining a motion path for a stationary object that the vehicle is moving past, and determining therefrom an angular deviation by which the motion path ascertained for the stationary object deviates from a motion path of the vehicle when the angular deviation is greater than or equal to a first predetermined limiting value an error message and/or a warning is/are output; and when the angular deviation is less than or equal to a second predetermined limiting value the angular deviation is drawn upon by way of a correction value when determining the position of objects by means of the environment-monitoring system.

2. The method according to claim 1, wherein when the vehicle is moving along a rectilinear motion path the motion path for the stationary object that the vehicle is moving past is ascertained, and from this the angular deviation is determined by which the motion path ascertained for the stationary object deviates from the rectilinear motion path of the vehicle.

3. The method according to claim 1, wherein a distance traveled by the vehicle between two successive determinations of position is ascertained, and from this a ground velocity of the vehicle is determined.

4. The method according to claim 3, wherein the ground velocity of the vehicle is drawn upon for determining a rolling circumference of wheels of the vehicle.

5. An environment-monitoring system for a motor vehicle, wherein the environment-monitoring system includes at least one sensor for monitoring the environment in front of and behind the vehicle parallel to the longitudinal axis of the vehicle and at least one sensor for monitoring the environment laterally adjacent to the vehicle perpendicular to the longitudinal axis of the vehicle, and has been set up to determine the positions of objects in the environment laterally adjacent to and also in front of and behind the vehicle, wherein an electronic control unit (ECU) with at least one microcomputer on which the method according to one of claim 1 has been stored at least partly as a computer program and runs at least partly.

6. The environment-monitoring system for a motor vehicle, according to claim 5, which has been designed as a non-tactile environment-monitoring system and configured as a radar, lidar or video system which has sensors registering its environment two-dimensionally or three-dimensionally, which register objects in a contactless manner and are radar antennas, cameras for the visible region of light, for the IR region and/or the UV region, or laser scanners.

7. An electronically controlled braking system for a motor vehicle, which includes, inter alia, an electronic stability program (ESP), wherein an environment-monitoring system according to claim 5 is a constituent of the braking system.

8. An electronically controlled driveline for a motor vehicle, which includes, inter alia, an electronic engine management system, wherein an environment-monitoring system according to claim 5 is a constituent of the driveline.

* * * * *